March 23, 1954

J. GREGORY 2,672,733

IRRIGATION SYSTEM, INCLUDING PUMPING
MEANS AND COOLING MEANS THEREFOR

Filed Oct. 27, 1953

INVENTOR,
Jess Gregory
BY
ATTORNEYS

Patented Mar. 23, 1954

2,672,733

UNITED STATES PATENT OFFICE 2,672,733

IRRIGATION SYSTEM, INCLUDING PUMPING MEANS AND COOLING MEANS THEREFOR

Jess Gregory, Lorenzo, Tex.

Application October 27, 1953, Serial No. 388,626

20 Claims. (Cl. 61—12)

The present invention relates to an irrigation system of a conventional type with which has been combined a novel cooling means for cooling an internal combustion engine, or other engine used in connection with the system and forming a part thereof.

The principal object of the invention is to provide, in an irrigation system, a cooling means including a cooling coil or equivalent structure. The fluid in the coil is cooled by the irrigation water.

Another object is to provide a system of irrigation having means for cooling water that is used in the engine which comprises the source of power, with supplementary means automatically controlled for directly feeding water from the well or other source of water supply into the cooling coil.

Yet another object is to provide in an irrigation system having a motor means and cooling means therefor, the latter including a heat exchange coil, an additional means for further cooling the liquid in the heat exchange coil.

Other objects will appear hereinafter throughout the specification.

It is customary in irrigation systems to provide a source of power hereinafter referred to as an internal combustion engine for operating the pump which conveys the water from a well, or other water source, such as a reservoir, dam, etc., to the flume of the irrigation system. Other types of engines may be used but for illustrative purposes, an internal combustion engine of the type used in motor cars or trucks is illustrated as a source of power. It will be understood, however, that other types of engines using gas, gasoline, butane, or other fuels may be used which employ water cooling systems, such as water jackets, to cool such engines during use.

In the ordinary use of such engines as the source of pumping power for irrigation purposes, the water cooling systems thereof are inadequate to cool these engines for best operating temperatures. This is due to the fact that the irrigation systems including the engines are very often located in arid sections of the country where the temperatures become quite high, especially during the day. The present invention is directed to the provision of means which preferably takes the place of, or may be used to supplement, the engine radiator, by means of the present invention a continuous supply of cool water from a coil which is in heat exchange relationship with the irrigation water, at or adjacent its source, is fed to the water jacket of the engine at all times during the operation thereof. Means is also provided for supplementing the cooling action of the coil in accordance with the temperature of the water of the supplying system of which the coil is an element.

Figure 1:
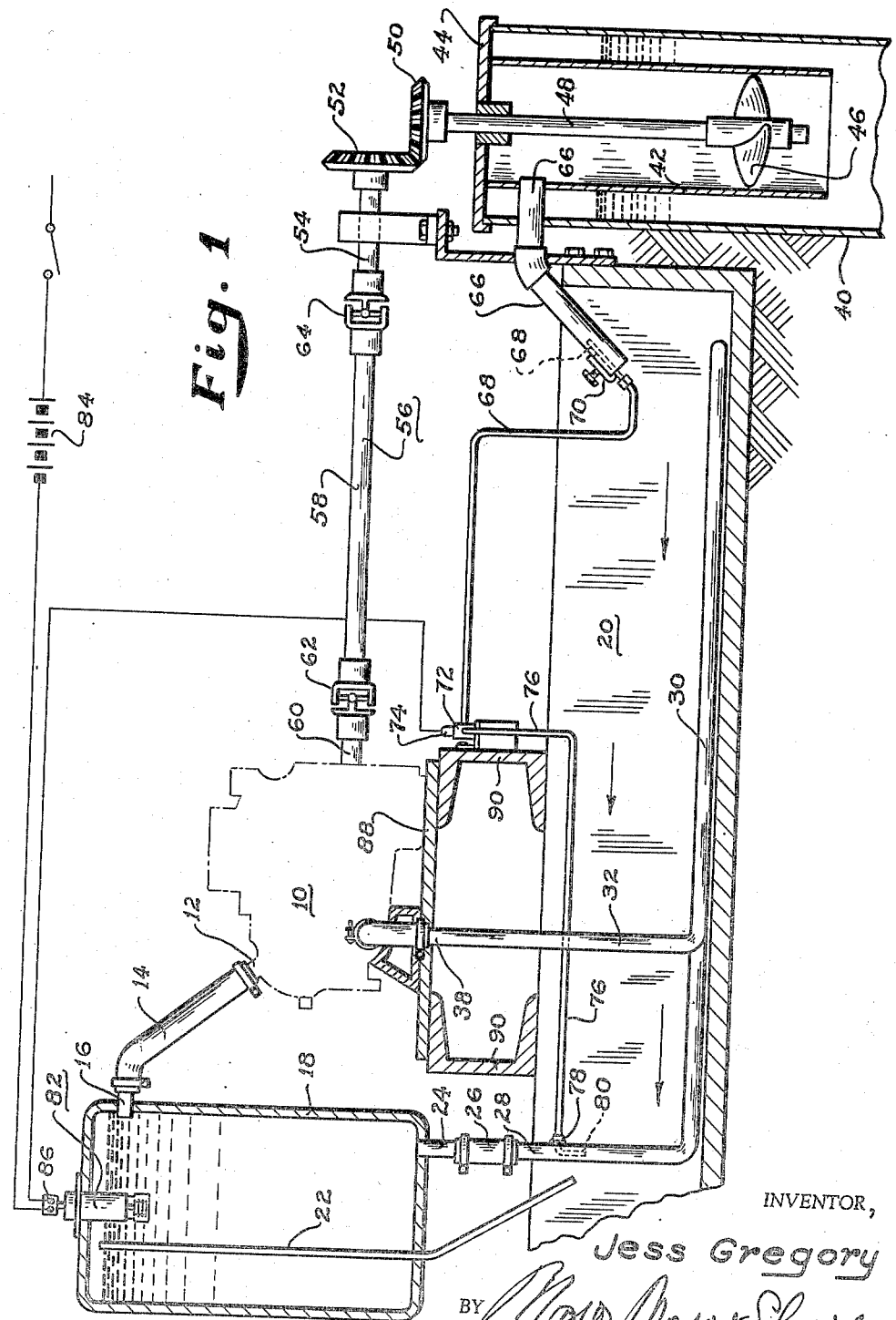
Figure 1 is a side elevational view, partly in section of an embodiment of the invention.
Figure 2:
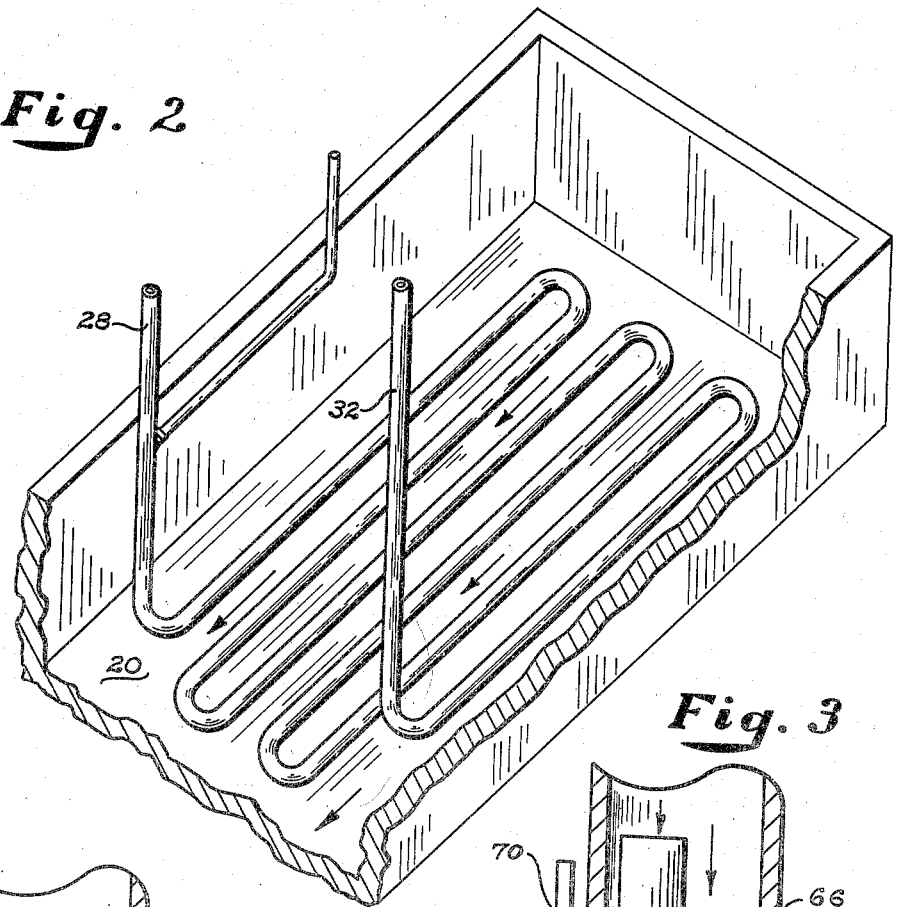
Figure 2 is a perspective view partly broken away of the flume, and of the cooling coil located therein.

Referring to the drawings, numeral 10 is an internal combustion engine having the usual water jacket, not shown. This engine is provided with an outlet 12 for heated water, that connects to a conduit 14, the exit end 16 of which empties into tank 18. Ordinarily, this end 16 would be connected to the automobile radiator, should the engine be used of an automobile. However, in the present case, the outlet for hot water from the water jacket has been connected to the tank 18 as shown in Figure 1. This tank is supported by suitable supports, not shown, on the flume 20. The tank is provided with an overflow pipe 22. The outlet 24 of the tank is connected to a flexible hose 26 at the upper end thereof, and the lower end is connected to pipe 28 that forms the inlet to the coil 30. Preferably, this coil lies in the bottom of the flume 20, so that water which passes along the flume is in direct heat exchange contact with the coil. The outlet pipe 32 from the coil is connected to the engine 10. This engine is provided with a conventional water pump, not shown, whereby a minus pressure is applied to the fluid in the coil outlet pipe 32 and a plus pressure is applied to the engine outlet 12.

As shown in Figure 1, the source of water comprises the well 40 having a pipe 42 mounted concentrically therein, and both the well and the pipe are closed by the top or stock 44. Located in pipe 42 is pump impeller 46, mounted on driven shaft 48. This shaft extends through stock 44 and is preferably provided with a bevel gear 50, which latter meshes with gear 52 that is driven by a shaft section 54. Shaft section 54 forms part of the drive shaft 56, which further consists of central section 58 and shaft section 60. These several shaft parts are connected to each other by universal joints 62 and 64. The shaft section 60 forms part of, or is directly connected to, the crank shaft of engine 10 so as to be driven thereby.

Extending through the well 40 and pipe 42 is the usual outlet pipe 66. This pipe may be of the closed type; i. e., circular in cross section, or it may be a trough that will lead off water which has been elevated by impeller 46.

A conventional clutch, not shown, may be interposed somewhere in the shafting system between the engine and the impeller, so as to disconnect the impeller during the operation of the engine. During the operation of the portion of the system above described, cool water is continuously elevated in pipe 42 and is deposited by gravity from pipe 66 into flume 20 and directly onto coil 30, the coils of which lie longitudinally along a portion thereof. At the same time, water is continuously pumped from the coil into the water jacket of the engine and after cooling the engine, out pipe 14 into tank 18, and from tank 18 back into the coil in a continuous circuit.

During certain portions of the day, and in extremely hot weather, water from the coil 30 may be insufficient to maintain the water in the water jacket of the engine at the desired temperature, of say between 160 to 170° F. When this condition occurs, the supplementary cooling means hereinafter described comes into operation to cause well water to be injected into the water as it issues from tank 18 into coil 30, or elsewhere in the circuit.

Figure 3:
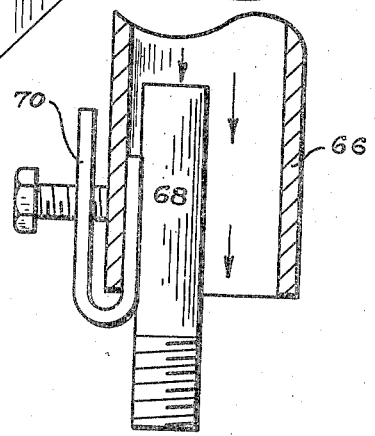
Figure 3 is a detail view partly in section showing the inlet for the supplementary cooling circuit and the means for attaching the same to the pipe outlet.
Figure 4:
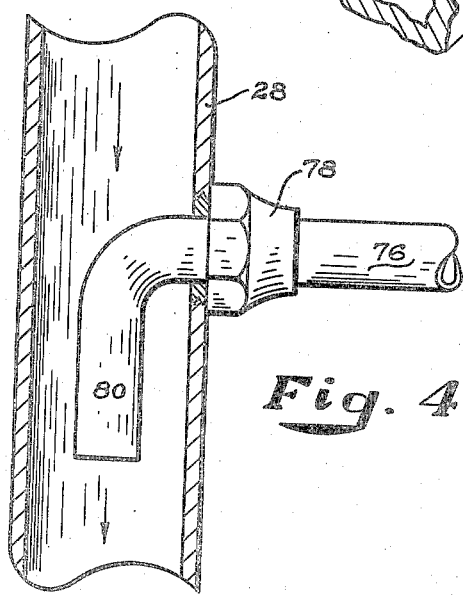
Figure 4 is a view partly in vertical section of the connection of the outlet of the pipe shown in Figure 3 into the cooling coil.

This supplementary cooling means comprises a pipe system provided with a pipe inlet 68. This pipe inlet may be clamped to the exit end of pipe 66 as shown in Figures 1 and 3, by means of clamp 70. The pipe 68 is connected to supplementary pump 72 which is driven by electric motor 74. This pump may be a small pump which is similar to, or the same as, the fuel pump used in the ordinary automobile engine system.

Outlet pipe 76 from this pump extends into pipe 28 by means of pipe coupling 78, the extreme end of the pipe having a down-turned portion 80 which acts as an injector within pipe 28. Electric motor 74 is provided with a lead that connects to thermostat 82 which is located within the tank 18. Both the thermostat and electric motor are connected to a suitable source of power 84. Thermostat 82 is provided with an electric switch 86.

When the temperature of the water within tank 18 exceeds the temperature, say 160 to 170° F., for which thermostat 82 has been set, the thermostat is operated in such manner as to complete an electric circuit to motor 74. This motor will then operate pump 72 to cause water to be circulated from inlet 68 through the pump 72, and through pipe 76 to outlet 80 thereof, to thereby inject cool water into pipe 28. This action will eventually serve to cool the water in the tank 18. When the temperature of the water in the tank has been lowered to the temperature to which the thermostat 82 has been set, switch 86 will be opened to discontinue the actuation of motor 74, thereby shutting down pump 72 and stopping the flow of water into the supplementary coolant system.

It will be understood that this water which passes from pipe 68 via pump 72 and pipe 76 to outlet 80 is cool water direct from well 40, so that this supplementary cooling means, in effect, causes cool water from the well to be injected into the water forming part of the primary cooling system. In said primary cooling system, the water in coil 30 is cooled by heat exchange from the water that is flowing in flume 20, but the water which is injected into pipe 28 from pipe 76, is water which is received directly from the well. Hence the water in tank 18 is quickly cooled before it enters coil 30.

It will be noted that the engine 10 may be mounted on a base 88 which rests upon supports 90 that extend across the top of the flume 20.

It will be appreciated that the invention as described above, includes two fluid circulatory systems for cooling an engine. The primary system cools the engine by means of heat exchange coils located so as to be cooled by the water from the well, by means of the usual heat exchange principle of cooling. The second or supplementary system includes the direct injection of a coolant fluid from a source of coolant fluid, into the flowing coolant of the first system. Although not illustrated, it will be further appreciated that the invention includes the location of the coil in the wheel or in the outlet thereof, instead of in the flume as shown.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, and pipe means connecting said coil means to said water cooling system of the internal combustion engine.

2. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, a water tank, and pipe means connecting said coil means and tank to said water cooling system of the internal combustion engine.

3. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, and pipe means connecting said coil means to said water cooling system of the internal combustion engine.

4. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, a water tank, and means connecting said coil means and water tank to said water cooling system of the internal combustion engine.

5. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, a water tank, pipe means connecting said coil means and tank to said water cooling system of the internal combustion engine, and secondary pipe means having ends, one of said ends having an opening located in said conduit means, and the other of said ends having an opening in said pipe means between said tank and said coil means.

6. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, a water tank, pipe means connecting said coil means and water tank to said water cooling system of the internal combustion engine, and secondary pipe means having ends, one of said ends having an opening located in said conduit means, and the other of said ends having an opening in said pipe means between said tank and said coil means.

7. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, a water tank, primary pipe means connecting said coil means and tank to said water cooling system of the internal combustion engine, and secondary pipe means having ends, one of said ends having an opening located in said conduit means, and the other of said ends having an opening in said primary pipe means between said tank and said water cooling system of the internal combustion engine.

8. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, a water tank, primary pipe means connecting said coil means and water tank to said water cooling system of the internal combustion engine, and secondary pipe means having ends, one of said ends having an opening located in said conduit means, and the other of said ends having an opening in said primary pipe means between said tank and said water cooling system of the internal combustion engine.

9. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, a water tank, primary pipe means connecting said coil means and tank to said water cooling system of the internal combustion engine, secondary pipe means having ends, one of said ends having an opening located in said conduit means, and the other of said ends having an opening in said primary pipe means between said tank and said water cooling system of the internal combustion engine, and pump means located in said secondary pipe means.

10. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, a water tank, primary pipe means connecting said coil means and water tank to said water cooling system of the internal combustion engine, secondary pipe means having ends, one of said ends having an opening located in said conduit means, and the other of said ends having an opening in said primary pipe means between said tank and said water cooling system of the internal combustion engine, and pump means located in said secondary pipe means.

11. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said conduit means, a water tank, primary pipe means connecting said coil means and tank to said water cooling system of the internal combustion engine, secondary pipe means having ends, one of said ends having an opening located in said conduit means, and the other of said ends having an opening in the primary pipe means between said tank and said water cooling system of the internal combustion engine, pump means located in said secondary pipe means, said last-named pump means including an electric motor for driving the same, and thermostatic means mounted in said tank having an electrical connection means to said last-named motor for controlling the operating of said motor in accordance with the temperature of water in said tank.

12. In an irrigation system including an internal combustion engine having a water cooling system, a water pump, means for driving said pump from said engine, conduit means including a flume extending from a source of irrigation water, said pump including an impeller for forcing water from said source to said flume, the combination with said system of: coil means located in said flume, a water tank, primary pipe means connecting said coil means and water tank to said water cooling system of the internal combustion engine, secondary pipe means having ends, one of said ends having an opening located in said conduit means, and the other of said ends having an opening in said primary pipe means between said tank and said water cooling system of the internal combustion engine, pump means located in said secondary pipe means, said last-named pump means including an electric motor for driving the same, and thermostatic means mounted in said tank having an electrical connection means to said last-named motor for controlling the operation of said motor in accordance with the temperature of water in said tank.

13. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, and pipe means connecting said coil means to said water cooling system of the internal combustion engine.

14. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, a water tank, and pipe means connecting said coil means and tank to said water cooling system of the internal combustion engine.

15. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, and secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine.

16. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine, and pump means located in said secondary pipe means.

17. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, and secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine, the last-named end of said secondary pipe means having an opening facing in the direction of water flow whereby to set up an injector movement of water flow in said water circulating system.

18. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine, and pump means located in said secondary pipe means, the last-named end of said secondary pipe means having an opening facing in the direction of water flow whereby to set up an injector movement of water flow in said water circulating system.

19. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, and secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine, the last-named end of said secondary pipe means having an opening facing in the direction of water flow whereby to set up an injector movement of water flow in said water circulating system, thermostatic control means located in said tank, means for driving said last-named pump and connections from said thermostat control means to said pump driving means whereby to control the operation of said pump in accordance with the temperature of the water in said tank.

20. In an irrigation system including an internal combustion engine having a water cooling system, a water pump located outside of said engine, means for driving said pump from said engine, conduit means including a flume extending from a water well, said water well forming the source of irrigation water, said pump including an impeller located in said well for forcing water from said source to said flume, the combination with said system of: coil means located in said flume, primary pipe means connecting said coil means to said water cooling system of the internal combustion engine, secondary pipe means having ends, one of said ends being located in said coil means and having an opening facing in the direction of water flow, the other end of said secondary pipe means being located in the water circulating system, said system including the tank, coil means and pipe means between said tank and said water cooling system of the internal combustion engine, and pump means located in said secondary pipe means, the last-named end of said secondary pipe means having an opening facing in the direction of water flow whereby to set up an injector movement of water flow in said water circulating system, thermostatic control means located in said tank, means for driving said last-named pump and connections from said thermostatic control means to said pump driving means whereby to control the operation of said pump in accordance with the temperature of the water in said tank.

JESS GREGORY.

No references cited.